(12) United States Patent
Inoue et al.

(10) Patent No.: US 8,193,108 B2
(45) Date of Patent: Jun. 5, 2012

(54) CLAD GLASS COMPOSITION AND MOTHER GLASS ROD FOR GRADIENT-INDEX ROD LENS FORMED USING THE SAME, GRADIENT-INDEX ROD LENS AND METHOD OF MANUFACTURING THE SAME, ROD LENS ARRAY, AND IMAGE PROCESSOR

(75) Inventors: Teruhide Inoue, Tokyo (JP); Kunihiro Nomiyama, Tokyo (JP); Koichi Sakaguchi, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 315 days.

(21) Appl. No.: 12/553,454

(22) Filed: Sep. 3, 2009

(65) Prior Publication Data
US 2009/0323196 A1    Dec. 31, 2009

Related U.S. Application Data

(62) Division of application No. 11/185,123, filed on Jul. 20, 2005, now abandoned.

(30) Foreign Application Priority Data

Jul. 23, 2004 (JP) .................. 2004-215417
Oct. 5, 2004 (JP) .................. 2004-292425

(51) Int. Cl.
*C03C 13/04* (2006.01)
*C03C 3/076* (2006.01)
*C03C 3/095* (2006.01)
*C03C 3/085* (2006.01)
*D02G 3/00* (2006.01)
*B32B 9/00* (2006.01)
*B32B 17/06* (2006.01)
*G02B 3/00* (2006.01)

(52) U.S. Cl. ............... 501/37; 501/55; 501/64; 501/69; 428/373; 428/378; 428/388; 428/426; 428/428; 359/652

(58) Field of Classification Search .................. None
See application file for complete search history.

(56) References Cited

U.S. PATENT DOCUMENTS

| | | | | |
|---|---|---|---|---|
| 2,699,399 | A * | 1/1955 | Armistead | 501/61 |
| 4,282,035 | A | 8/1981 | Nigrin | |
| 4,495,298 | A | 1/1985 | Yamagishi et al. | |
| 4,572,611 | A * | 2/1986 | Bellman et al. | 399/218 |
| 5,308,803 | A | 5/1994 | Clifford et al. | |
| 6,141,155 | A | 10/2000 | Yamaguchi et al. | |
| 6,476,975 | B1 * | 11/2002 | Yoshii et al. | 359/652 |
| 6,598,429 | B1 * | 7/2003 | Jiang et al. | 65/412 |

(Continued)

FOREIGN PATENT DOCUMENTS

CN    1295986 A    5/2001

(Continued)

*Primary Examiner* — Melvin C Mayes
*Assistant Examiner* — Guinever Gregorio
(74) *Attorney, Agent, or Firm* — Hamre, Schumann, Mueller & Larson, P.C.

(57) ABSTRACT

A clad glass composition that is excellent in devitrification resistance and that prevents the whole mother glass rod from devitrifying by preventing a core glass composition from devitrifying in forming a mother glass rod using a concentric crucible drawing method, is provided. The clad glass composition forms a clad of a mother glass rod for a gradient-index rod lens having a core/clad structure.

6 Claims, 11 Drawing Sheets

U.S. PATENT DOCUMENTS

| | | | |
|---|---|---|---|
| 7,250,383 B2 * | 7/2007 | Inoue et al. | 501/55 |
| 7,382,541 B2 * | 6/2008 | Inoue et al. | 359/652 |
| 7,576,021 B2 * | 8/2009 | Miyauchi et al. | 501/72 |
| 2004/0077478 A1 | 4/2004 | Inoue et al. | |
| 2005/0231815 A1 * | 10/2005 | Miyauchi et al. | 359/652 |
| 2006/0019815 A1 * | 1/2006 | Inoue et al. | 501/72 |
| 2006/0082895 A1 * | 4/2006 | Inoue et al. | 359/652 |
| 2008/0213495 A1 * | 9/2008 | Miyauchi et al. | 427/443.2 |
| 2009/0323196 A1 * | 12/2009 | Inoue et al. | 359/652 |

FOREIGN PATENT DOCUMENTS

| | | |
|---|---|---|
| EP | 1 018 657 | 7/2000 |
| JP | 64-76931 | 3/1989 |
| JP | 1-103927 | 4/1989 |
| JP | 5-72337 | 10/1993 |
| JP | 8-13691 | 2/1996 |
| JP | 2004-151682 | 5/2004 |
| WO | WO 00-04409 | 1/2000 |

* cited by examiner

CLAD GLASS COMPOSITION AND MOTHER GLASS ROD FOR GRADIENT-INDEX ROD LENS FORMED USING THE SAME, GRADIENT-INDEX ROD LENS AND METHOD OF MANUFACTURING THE SAME, ROD LENS ARRAY, AND IMAGE PROCESSOR

This application is a division of U.S. Ser. No. 11/185,123, filed Jul. 20, 2005 now abandoned which application is incorporated herein by reference.

BACKGROUND OF THE INVENTION

1. Field of the Invention

The present invention relates generally to a glass composition (a clad glass composition) that forms a clad of a mother glass rod for gradient-index rod lens having a core/clad structure, and a mother glass rod for a gradient-index rod lens formed using the same. The present invention also relates to a gradient-index rod lens formed of the mother glass rod and a method of manufacturing the same as well as a rod lens array and an image processor that include the rod lens.

2. Related Background Art

A gradient-index rod lens (hereinafter also referred to simply as a "rod lens") is a rod-shaped optical element having a refractive index distribution from its center to its periphery in the section thereof. The rod lens can exhibit lens functions such as, for instance, an imaging function even when both the end faces thereof are flat, and has many features including one that facilitates the production of lenses with minute diameters, for instance. Using such features, a rod lens array in which the rod lenses described above are arrayed is employed for a wide range of uses as an imaging lens in an optical system of an image processor (for example, an image-forming apparatus such as an LED array printer, a liquid crystal shutter printer, etc, or an image scanner such as a facsimile, a scanner, etc.).

The gradient-index rod lens usually is formed by providing a mother glass rod for a gradient-index rod lens (hereinafter also referred to simply as a "mother glass rod") with a refractive index distribution. The mother glass rod is manufactured by a direct drawing method (a continuous drawing method) that has been used widely due to its excellent productivity. In the direct drawing method, as shown in FIG. 10, molten glass 101 that has been subjected to a degassing process (a fining process) as required is put into a crucible 103 that is kept warm with a heater 102. The molten glass 101 flows out of the lower end of a nozzle 104 located in a lower end portion of the crucible 103 while being cooled gradually inside the nozzle 104. Thereby a mother glass rod (a fiber) 105 with a diameter of about 0.1 mm to 4 mm can be formed continuously through hot drawing. In this method, the drawing speed (a formation speed) at which the mother glass rod 105 is drawn can be several tens of meters per minute while the crucible 103 can be charged with the molten glass continuously. Thus the productivity in manufacturing the mother glass rod can be increased.

The direct drawing method, however, has a disadvantage that the molten glass 101 tends to devitrify when being cooled gradually inside the nozzle 104. Particularly, molten glass that is free from lead (whose typical composition is PbO) tends to devitrify when being drawn by the direct drawing method using a crucible.

In order to prevent such devitrification from occurring during the drawing, for instance, JP8 (1996)-13691A discloses a method in which additives such as $BPO_4$, $Al_2(PO_3)_3$, etc. are added to molten glass.

Furthermore, JP5 (1993)-72337A discloses a method of forming a mother glass rod 118 having a structure (a core/clad structure) composed of a core 116 and a clad 117 covering the core 116 by the direct drawing method (a concentric crucible drawing method) using a concentric crucible 115 including an inner crucible 113 and an outer crucible 114 (see FIG. 11). The inner crucible 113 and the outer crucible 114 are charged with a core glass composition 111 that forms the core 116 and a clad glass composition 112 that forms a clad 117, respectively, with the core glass composition 111 and the clad glass composition 112 being in a molten state. The respective glass compositions are allowed to flow out from a nozzle 119 located in the lower end portion of the concentric crucible 115 to form the mother glass rod 118. The mother glass rod 118 thus formed can be drawn out continuously with rollers 120. In this case, when a glass composition that tends not to cause devitrification is employed as the clad glass composition 112, the core glass composition 111 can be prevented from coming into contact with the nozzle 119 even in the temperature region where devitrification tends to occur in the case of using the direct drawing method. Accordingly, the core glass composition 111 can be prevented from devitrifying and thus the whole mother glass rod 108 can be prevented from devitrifying during the drawing.

JP2004-151682A discloses an example of the clad glass composition that tends not to cause devitrification, specifically:

a clad glass composition of a mother glass rod for a gradient-index rod lens that is substantially free from PbO (unless containing both $TiO_2$ and $La_2O_3$), wherein the clad glass composition is substantially free from PbO and substantially includes the following components, indicated by mol %:

45 to 65% $SiO_2$;
3 to 30% $Na_2O$;
0 to 10% $K_2O$;
0 to 15% MgO;
0 to 20% BaO;
0 to 15% $B_2O_3$,
0 to 10% ZnO;
0 to 10% $TiO_2$;
0 to 7% $Y_2O_3$;
0 to 7% $ZrO_2$;
0 to 7% $Nb_2O_5$;
0 to 7% $In_2O_3$;
0 to 7% $La_2O_3$; and
0 to 10% $Ta_2O_5$, where the total of $Na_2O+K_2O$ is in the range of 3 to 35 mol %, the total of MgO+BaO is in the range of 0 to 25 mol %, and the total of $B_2O_3+ZnO+TiO_2+Y_2O_3+ZrO_2+Nb_2O_5+In_2O_3+La_2O_3+Ta_2O_5$ is in the range of 0 to 20 mol %.

SUMMARY OF THE INVENTION

The present invention is intended to provide a clad glass composition that is different in composition from such a conventional clad glass composition but is excellent in devitrification resistance and prevents a core glass composition from devitrifying to make it possible to prevent a mother glass rod as a whole from devitrifying in forming the mother glass rod using the concentric crucible drawing method.

The present invention also is intended to provide a mother glass rod, a rod lens, a rod lens array, and an image processor that are formed using the above-mentioned clad glass composition of the present invention, as well as a method of manufacturing the above-mentioned rod lens.

The clad glass composition of the present invention forms a clad of a mother glass rod for a gradient-index rod lens having a core/clad structure, wherein the clad glass composition includes the following components, indicated by mol %:
  45 to 65% $SiO_2$;
  0.5 to 10% $TiO_2$;
  0 to 15% $B_2O_3$;
  0 to 7% $Al_2O_3$;
  0.1 to 10% $Bi_2O_3$;
  0 to 5% $Li_2O$;
  5 to 30% $Na_2O$;
  0 to 10% $K_2O$;
  0 to 15% MgO;
  0 to 10% CaO;
  0 to 10% SrO;
  0.5 to 10% BaO;
  0 to 10% $Cs_2O$;
  0 to 10% ZnO;
  0 to 7% $Y_2O_3$;
  0 to 7% $Nb_2O_5$;
  0 to 7% $In_2O_3$;
  0 to 7% $La_2O_3$;
  0 to 10% $Ta_2O_5$;
  0 to 7% $ZrO_2$; and
  0 to 1% $Sb_2O_3$, where the total of $Li_2O+Na_2O+K_2O$ is in the range of 5 to 35 mol %, the total of MgO+CaO+SrO+BaO is in the range of 2 to 20 mol %, the total of $Li_2O+Na_2O+K_2O$+MgO+CaO+SrO+BaO is in the range of 7 to 50 mol %, and the total of $Cs_2O+ZnO+Y_2O_3+Nb_2O_5+In_2O_3+La_2O_3+ZrO_2+Ta_2O_5$ is in the range of 0 to 15 mol %, at least two molar ratios selected from the group consisting of:
  MgO/(MgO+CaO+SrO+BaO);
  CaO/(MgO+CaO+SrO+BaO);
  SrO/(MgO+CaO+SrO+BaO); and
  BaO/(MgO+CaO+SrO+BaO)
  are at least 0.1, and the clad glass composition is substantially free from lead and has a refractive index in the range of 1.56 to 1.68.

The mother glass rod for a gradient index rod lens of the present invention has a core/clad structure, wherein a clad glass composition that forms a clad is the above-mentioned clad glass composition of the present invention, and a core glass composition that forms a core has a different composition from the clad glass composition.

The mother glass rod for a gradient-index rod lens of the present invention has a core/clad structure, wherein a clad glass composition that forms a clad is the above-mentioned clad glass composition of the present invention, a core glass composition that forms a core includes the following components, indicated by mol %:
  40 to 65% $SiO_2$;
  1 to 10% $TiO_2$;
  0 to 20% $B_2O_3$;
  0 to 10% $Al_2O_3$;
  5 to 12% $Li_2O$;
  5 to 15% $Na_2O$;
  0 to 16% MgO;
  0 to 15% CaO;
  0.1 to 12% SrO;
  0.1 to 12% BaO;
  0 to 3% $Cs_2O$;
  0 to 8% ZnO;
  0 to 5% $Y_2O_3$;
  0 to 5% $Nb_2O_5$;
  0 to 5% $In_2O_3$;
  0 to 5% $La_2O_3$;
  0 to 5% $Ta_2O_5$;
  0 to 1% $SnO_2$;
  0 to 1% $Sb_2O_3$; and
  0 to 1% $As_2O_3$, where the total of $SiO_2+TiO_2+B_2O_3+Al_2O_3$ is in the range of 50 to 70 mol %, the total of $Li_2O+Na_2O$ is in the range of 10 to 27 mol %, the molar ratio of $Li_2O/Na_2O$ is in the range of 0.7 to 2, and the total of MgO+CaO+SrO+BaO is in the range of 5 to 36 mol %, at least two values selected from the contents by percentage of CaO, SrO, and BaO are in the range of 0.1 to 15 mol %, at least two molar ratios selected from the group consisting of:
  MgO/(MgO+CaO+SrO+BaO);
  CaO/(MgO+CaO+SrO+BaO);
  SrO/(MgO+CaO+SrO+BaO); and
  BaO/(MgO+CaO+SrO+BaO)
  are at least 0.1, and the core glass composition is substantially free from lead.

The gradient-index rod lens of the present invention is a rod lens obtained by providing the above-mentioned mother glass rod for a gradient-index rod lens of the present invention with a refractive index distribution by an ion exchange method.

The rod lens array of the present invention includes at least two gradient-index rod lenses according to the present invention, wherein the rod lenses are arrayed and formed into one body, with their optical axes being substantially in parallel with each other.

The image processor of the present invention includes the above-mentioned rod lens array of the present invention, wherein the rod lens array serves as an imaging optical system.

The method of manufacturing a gradient-index rod lens of the present invention includes: charging a crucible (an outer crucible) located on the outer side of a concentric crucible with a melt of a clad glass composition (a clad glass composition that is in a molten state, i.e. a molten clad glass composition) having a composition (A); charging a crucible (an inner crucible) located on the inner side of the concentric crucible with a melt of a core glass composition (a core glass composition that is in a molten state, i.e. a molten core glass composition) having a composition (B); forming a mother glass rod for a gradient-index rod lens having a core/clad structure by a concentric crucible drawing method; and providing the mother glass rod with a refractive index distribution by an ion exchange method in which the mother glass rod formed above is immersed in molten salt containing sodium, wherein the clad glass composition having the composition (A) includes the following components, indicated by mol %:
  45 to 65% $SiO_2$;
  0.5 to 10% $TiO_2$;
  0 to 15% $B_2O_3$;
  0 to 7% $Al_2O_3$;
  0.1 to 10% $Bi_2O_3$;
  0 to 5% $Li_2O$;
  5 to 30% $Na_2O$;
  0 to 10% $K_2O$;
  0 to 15% MgO;
  0 to 10% CaO;
  0 to 10% SrO;

0.5 to 10% BaO;
0 to 10% $Cs_2O$;
0 to 10% ZnO;
0 to 7% $Y_2O_3$;
0 to 7% $Nb_2O_5$;
0 to 7% $In_2O_3$;
0 to 7% $La_2O_3$;
0 to 10% $Ta_2O_5$;
0 to 7% $ZrO_2$; and
0 to 1% $Sb_2O_3$,
where the total of $Li_2O+Na_2O+K_2O$ is in the range of 5 to 35 mol %,
the total of MgO+CaO+SrO+BaO is in the range of 2 to 20 mol %,
the total of $Li_2O+Na_2O+K_2O+MgO+CaO+SrO+BaO$ is in the range of 7 to 50 mol %, and
the total of $Cs_2O+ZnO+Y_2O_3+Nb_2O_5+In_2O_3+La_2O_3+ZrO_2+Ta_2O_5$ is in the range of 0 to 15 mol %,
at least two molar ratios selected from the group consisting of:
MgO/(MgO+CaO+SrO+BaO);
CaO/(MgO+CaO+SrO+BaO);
SrO/(MgO+CaO+SrO+BaO); and
BaO/(MgO+CaO+SrO+BaO)
are at least 0.1, and
the clad glass composition is substantially free from lead and has a refractive index in the range of 1.56 to 1.68, and
wherein the core glass composition having the composition (B) includes the following components, indicated by mol %:
40 to 65% $SiO_2$;
1 to 10% $TiO_2$;
0 to 20% $B_2O_3$;
0 to 10% $Al_2O_3$;
5 to 12% $Li_2O$;
5 to 15% $Na_2O$;
0 to 16% MgO;
0 to 15% CaO;
0.1 to 12% SrO;
0.1 to 12% BaO;
0 to 3% $Cs_2O$;
0 to 8% ZnO;
0 to 5% $Y_2O_3$;
0 to 5% $Nb_2O_5$;
0 to 5% $In_2O_3$;
0 to 5% $La_2O_3$;
0 to 5% $Ta_2O_5$;
0 to 1% SnO2;
0 to 1% $Sb_2O_3$; and
0 to 1% $As_2O_3$,
where the total of $SiO_2+TiO_2+B_2O_3+Al_2O_3$ is in the range of 50 to 70 mol %,
the total of $Li_2O+Na_2O$ is in the range of 10 to 27 mol %,
the molar ratio of $Li_2O/Na_2O$ is in the range of 0.7 to 2, and
the total of MgO+CaO+SrO+BaO is in the range of 5 to 36 mol %,
at least two values selected from the contents by percentage of CaO, SrO, and BaO are in the range of 0.1 to 15 mol %,
at least two molar ratios selected from the group consisting of:
MgO/(MgO+CaO+SrO+BaO);
CaO/(MgO+CaO+SrO+BaO);
SrO/(MgO+CaO+SrO+BaO); and
BaO/(MgO+CaO+SrO+BaO)
are at least 0.1, and
the core glass composition is substantially free from lead.

BRIEF DESCRIPTION OF THE DRAWINGS

FIG. 1A is a schematic view showing an example of the mother glass rod according to the present invention while

DETAILED DESCRIPTION OF THE INVENTION

Figure 1A:
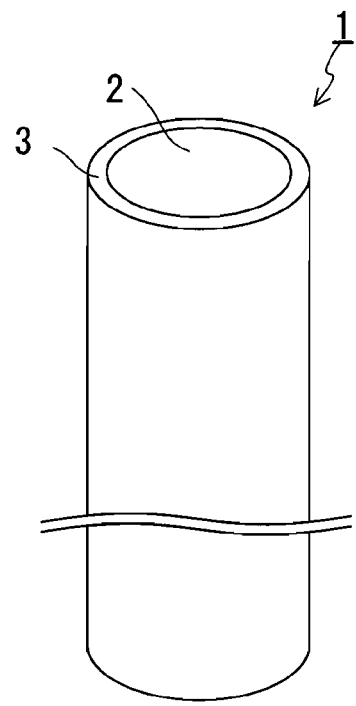

In the following descriptions, identical members may be indicated with the same reference numbers and letters and the same descriptions may not be repeated.

Clad Glass Composition of the Present Invention

The clad glass composition of the present invention is excellent in devitrification resistance. Accordingly, when a mother glass rod having a core/clad structure is to be formed by the concentric crucible drawing method, the core glass composition can be prevented from devitrifying and thus the whole mother glass rod to be formed can be prevented from devitrifying. This effect can be obtained even when the core glass composition is substantially free from lead and has a composition that tends to allow the devitrification to occur. That is, the clad glass composition of the present invention makes it possible to form stably a mother glass rod made of a glass composition that is substantially free from lead.

Devitrification Resistance

The clad glass composition of the present invention usually does not devitrify when it is maintained at a temperature in the range of 600° C. to 1000° C. for 120 hours. Accordingly, the mother glass rod to be formed can be prevented substantially from devitrifying in forming the mother glass rod by the concentric crucible drawing method. In this context, the expression "not devitrify" denotes that no devitrified body (no devitrification phase) is observed in glass in a devitrification resistance evaluation test (for details see the Example below) in which a molten glass composition is maintained under a predetermined condition and then is solidified and thereby a glass is obtained and then is observed with an optical microscope (of a magnification around 100 times). Such a characteristic of a glass composition is referred to as "having devitrification resistance".

Composition

The reasons for limiting the composition of the clad glass composition according to the present invention are described below. In the following descriptions, the unit "%" by which the composition is indicated denotes "mol %".

$SiO_2$ $SiO_2$ is a component that forms a network structure of glass. The $SiO_2$ content by percentage of less than 45% makes it difficult to form a glass composition. On the other hand, the $SiO_2$ content by percentage exceeding 65% results in production of a glass composition having an excessively high melting temperature and thus makes it difficult to obtain a practical glass composition.

$TiO_2$ $TiO_2$ is a component that forms a network structure of glass, and has an effect of increasing the refractive index of a glass composition. When the $TiO_2$ content by percentage is lower than 0.5%, the above-mentioned effect of increasing the refractive index cannot be obtained satisfactorily. On the other hand, when the $TiO_2$ content by percentage exceeds 10%, devitrification tends to occur.

$B_2O_3$ $B_2O_3$ is an optional component that promotes the vitrification of a clad glass composition. The $B_2O_3$ content by percentage exceeding 15% results in an increase in the amount of $B_2O_3$ that volatilizes when melted. This causes heavy corrosion of a refractory member composing the manufacturing apparatus. When the $SiO_2$ content by percentage is 50% or less, $B_2O_3$ may be required in some cases.

$Al_2O_3$ $Al_2O_3$ is an optional component and the content by percentage thereof may be 7% or less.

$Bi_2O_3$ $Bi_2O_3$ is a component having effects of lowering the melting temperature and increasing the refractive index of a glass composition. From the viewpoint of matching with a core glass composition, when the content by percentage of alkaline-earth metal oxides contained in a clad glass composition is excessively large, the clad glass composition tends to devitrify. Hence, the clad glass composition of the present invention includes $Bi_2O_3$ as a component that limits the content by percentage of alkaline-earth metal oxides while lowering the melting temperature thereof. In the present specification, the alkaline-earth metals include magnesium (Mg).

When the $Bi_2O_3$ content by percentage is less than 0.1%, the above-mentioned effects cannot be obtained satisfactorily. On the other hand, when the $Bi_2O_3$ content by percentage exceeds 10%, devitrification tends to occur and the specific gravity becomes excessively high. Preferably, the $Bi_2O_3$ content by percentage is 0.5% to 5%, wherein the lower limit is more preferably 1.5% and further preferably 2%.

$Li_2O$ $Li_2O$ is an optional component that has an effect of lowering the melting temperature. The clad glass composition of the present invention may contain 5% of $Li_2O$ or less. The $Li_2O$ content by percentage, however, is preferably less than 5% and more preferably 3% or less. When the $Li_2O$ content by percentage exceeds 5%, the chemical durability deteriorates and devitrification tends to occur.

$Na_2O$ $Na_2O$ is a component that has an effect of lowering the melting temperature. The $Na_2O$ content by percentage of less than 5% results in an excessively high melting temperature. On the other hand, the $Na_2O$ content by percentage exceeding 30% results in deteriorated chemical durability. Preferably, the $Na_2O$ content by percentage is 10% to 27%.

$K_2O$ $K_2O$ is an optional component that has an effect of lowering the melting temperature. The $K_2O$ content by percentage exceeding 10% results in deteriorated chemical durability.

$Li_2O+Na_2O+K_2O$

In the clad glass composition of the present invention, the total $X_1$ of the contents by percentage of alkali metal oxides (i.e. $Li_2O+Na_2O+K_2O$) is 35% or less, which makes it possible to prevent the durability from deteriorating. The total $X_1$ is preferably 10% to 27%, wherein the upper limit thereof is more preferably 21%. In the present specification, $Cs_2O$ is excluded from the alkali metal oxides since it is considered to be included in other components described later.

MgO

MgO is an optional component that has an effect of lowering the melting temperature. When the MgO content by percentage exceeds 15%, devitrification tends to occur.

CaO

CoO also is an optional component that has an effect of lowering the melting temperature. When the CaO content by percentage exceeds 10%, devitrification tends to occur.

SrO

SrO is an optional component that has effects of lowering the melting temperature and increasing the refractive index of a glass composition. When the SrO content by percentage exceeds 10%, devitrification tends to occur.

BaO

BaO is a component that has effects of lowering the melting temperature and increasing the refractive index of a glass composition. When the BaO content by percentage is less than 0.5%, the above-mentioned effects cannot be obtained satisfactorily. On the other hand, when the BaO content by percentage exceeds 10%, devitrification tends to occur and the specific gravity becomes excessively high.

Alkaline-Earth Metal Oxides

The alkaline-earth metal oxides have an effect of lowering the melting temperature. On the other hand, when the content by percentage thereof is excessively large, devitrification tends to occur. Hence, at least two types of alkaline-earth metal oxides are contained in the clad glass composition of the present invention. This is because when at least two types of alkaline-earth metal oxides are contained together, the effect of lowering the melting temperature is amplified and as a result, the total $X_2$ of the contents by percentage of the alkaline-earth metal oxides (i.e. MgO+CaO+SrO+BaO) can be reduced.

That is, in the clad glass composition of the present invention, at least two molar ratios selected from the group consisting of:
MgO/(MgO+CaO+SrO+BaO);
CaO/(MgO+CaO+SrO+BaO);
SrO/(MgO+CaO+SrO+BaO); and
BaO/(MgO+CaO+SrO+BaO) are at least 0.1.

The total $X_2$ is 2% to 20% but in order to improve the devitrification resistance further, it is preferably 2% to 17%, more preferably 2% to 12%, and further preferably 2% to 11%.

Moreover, in order to further improve the devitrification resistance, the total $X_3$ of the contents by percentage of the alkaline-earth metal oxides (i.e. CaO+SrO+BaO) other than MgO is preferably 2% to 7%, more preferably 2% to 6%, and further preferably 2% to 5%.

Alkali Metal Oxides+Alkaline-Earth Metal Oxides

In the clad glass composition of the present invention, in order to secure the devitrification resistance to be provided, the total $X_4$ of the contents by percentage of the alkali metal oxides and alkaline-earth metal oxides (i.e. $Li_2O+Na_2O+K_2O+MgO+CaO+SrO+BaO$) is limited in the range of 7% to 50%. The total $X_4$ is more preferably 7% to 35%.

Other Components

The clad glass composition of the present invention may include $Cs_2O$, $ZnO$, $Y_2O_3$, $Nb_2O_5$, $In_2O_3$, $La_2O_3$, $Ta_2O_5$, and $ZrO_2$ in the above-mentioned composition ranges. These components have an effect of increasing the refractive index of a glass composition.

The total $X_5$ of the contents by percentage of such components (i.e. $Cs_2O+ZnO+Y_2O_3+Nb_2O_5+In_2O_3+La_2O_3+Ta_2O_5+ZrO_2$) is limited in the range of 0% to 15% in order to secure the devitrification resistance to be provided.

The clad glass composition of the present invention may include $Sb_2O_3$ that is a component derived from a fining agent. The content by percentage thereof usually is 0% to 1%.

Lead

The clad glass composition of the present invention is substantially free from lead (whose typical composition is PbO). The core glass composition covered by the clad glass composition of the present invention also is substantially free from lead. Accordingly, a mother glass rod that is formed using the above-mentioned clad glass composition as well as a rod lens and a rod lens array that are formed of the mother glass rod also are substantially free from lead. In this context, the expression "substantially free" described in the present specification denotes that the content by percentage of the component concerned is less than 0.1 mol %.

Hence, the mother glass rod, the rod lens, the rod lens array, etc. of the present invention are in conformity with the lead regulations that are included in the environmental regulations of various countries, for instance, the regulations of use of toxic substances in the EU such as "Restrictions of use of certain Hazardous Substances (RoHS)", "Waste Electrical and Electronic Equipment (WEEE)", etc.

Refractive Index

The clad glass composition of the present invention has a refractive index $n_2$ in the range of 1.56 to 1.68, which results in easy matching with a core glass composition that is suitable for a rod lens. It is possible to prevent stray light from occurring in a rod lens formed using the above-mentioned clad glass composition although the extent to which the stray light is prevented from occurring differs according to the difference $\Delta n$ between the above-mentioned refractive index $n_2$ and the refractive index $n_1$ of a core glass composition to be combined with the clad glass composition.

Colorant

The clad glass composition of the present invention may include an oxide of at least one element selected from the group consisting of Fe, Co, Ni, Mn, Cr, and Cu, as a colorant. When it includes a colorant, stray light further can be prevented from occurring in a rod lens formed using the clad glass composition of the present invention, due to the optical absorption of the colorant.

The total $X_6$ of the contents by percentage of such colorant oxides included in the clad glass composition is preferably 5 mol % or less. When the total $X_6$ exceeds 5 mol %, devitrification tends to occur.

The metal oxides contained as a colorant basically are oxides of metal elements that do not contribute directly to the ion exchange in forming a rod lens from a mother glass rod. Generally, the physical properties, such as the density, viscosity, thermal expansion coefficient, etc., of a glass composition vary in proportion to the content by percentage of the colorant. In addition, when the content by percentage of the colorant is excessively large, the glass composition tends to devitrify in the drawing process to be carried out by the concentric crucible drawing method. Hence, it is preferable that the content by percentage of the colorant be as small as possible in the range that allows light with a target wavelength to be absorbed at a predetermined rate. In addition, the content by percentage of the colorant is preferably as small as possible in order to allow the refractive index distribution of a rod lens to approximate a parabolic distribution as much as possible.

From such a viewpoint, suitable colorants are an oxide of Co (CoO) and an oxide of Fe ($Fe_2O_3$).

When CoO is included as a colorant, the glass composition intensively absorbs light with wavelengths in the region of 520 nm to 680 nm due to the presence of $Co^{2+}$ ions. The above-mentioned absorption increases in proportion to the CoO content by percentage. Hence, the larger the CoO content by percentage, the greater the effect of removing light components that enter the clad but do not contribute to imaging. For the above-mentioned reasons, however, the CoO content by percentage is limited in the range of 0.2 mol % to 2 mol %.

When white light is used as the light to be emitted from a light source to enter a rod lens, consideration has to be given to the removal of light with wavelengths in the whole visible-light region. Accordingly, the fact alone that CoO is included in the glass composition is not enough for allowing high absorptance to be obtained with respect to light with wavelengths of 500 nm or shorter. An oxide of Fe (trivalent) can be used as a colorant that absorbs light with wavelengths of 500 nm or shorter. $Fe^{3+}$ intensively absorbs light with wavelengths in the region of 380 nm to 460 nm. For the above-mentioned reasons, the $Fe_2O_3$ content by percentage is limited in the range of 0.2 mol % to 5 mol %.

As described above, when both $Co^{2+}$ ions and $Fe^{3+}$ ions are present in the clad glass composition, light with wavelengths in the whole visible-light region can be removed efficiently.

An oxide of Ni (NiO) absorbs light with wavelengths in the region (420 nm to 500 nm) that exists between the region of the wavelengths of light to be absorbed by CoO and that of the wavelengths of light to be absorbed by $Fe_2O_3$. NiO therefore may be included together with CoO and $Fe_2O_3$. When the NiO content by percentage is excessively large, devitrification tends to occur. Accordingly, the NiO content by percentage is preferably as small as possible, specifically 2 mol % or less.

Oxides of Cr, Mn, and Cu absorb light with wavelengths of 500 nm or shorter. For instance, an oxide of Cr ($Cr_2O_3$) intensively absorbs light with wavelengths in the region of 380 nm to 430 nm that is substantially the same region as that of wavelengths of light to be absorbed by $Fe_2O_3$. The absorptance of the $Cr_2O_3$ is higher than that of $Fe_2O_3$. However, a clad glass composition, particularly a clad glass composition including lithium tends to devitrify due to the presence of $Cr_2O_3$. Accordingly, the $Cr_2O_3$ content by percentage is 2 mol % or less.

When existing in the form of $Mn^{3+}$ in a glass composition, an oxide of Mn (MnO) intensively absorbs light with wavelengths in the region of 440 nm to 500 nm. MnO, however, exists in the form of $Mn^{2+}$ when being present together with $Fe_2O_3$ and thereby the above-mentioned absorption effect cannot be obtained. Hence, the MnO content by percentage can be up to 2 mol %, but the effect to be provided by MnO as a colorant deteriorates when MnO is present together with $Fe_2O_3$.

An oxide of Cu (CuO) intensively absorbs light with wavelengths of 600 nm or longer. For the reasons described above, the CuO content by percentage is 2 mol % or less.

In addition to the respective components described above, the clad glass composition of the present invention may include the following various components, each of which is less than 0.5 mol %, for instance: $As_2O_3$, $SO_3$, $SnO_2$, and F that are components derived from a fining agent to be used for degassing (fining) when the clad glass composition is melted (F is derived from a fluorine compound); and impurities derived from industrial glass materials.

Mother Glass Rod for Gradient-Index Rod Lens of the Present Invention

Figure 1B:
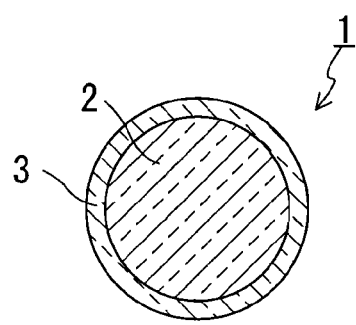
FIG. 1B is a cross-sectional view showing a section of the mother glass rod shown in FIG. 1A cut at a plane perpendicular to the direction of the optical axis thereof.

FIG. 1A is a schematic view showing an example of the mother glass rod of the present invention. FIG. 1B is a cross-sectional view showing a section of the mother glass rod 1 shown in FIG. 1A cut in the direction (the radial direction) perpendicular to the optical axis direction (i.e. the longitudinal axis direction) of the mother glass rod 1. As shown in FIGS. 1A and 1B, the mother glass rod 1 has a structure (a core/clad structure) in which a clad 3 covers the periphery of a core 2. In this case, the clad glass composition that forms the clad 3 is the above-mentioned clad glass composition of the present invention. The mother glass rod 1 can be manufactured without causing devitrification to occur and is excellent in productivity. Furthermore, a rod lens that prevents stray light from occurring can be formed by controlling the difference in refractive index between the clad glass composition and the core glass composition that forms the core 2 and allowing the clad glass composition to include the above-mentioned colorants as required. In FIGS. 1A and 1B, a clear boundary line is shown between the core 2 and the clad 3. In an actual mother glass rod 1, however, the boundary line is not always observed visually.

Core Glass Composition

The core glass composition that forms the core 2 may have the compositions described before. The core glass composition is substantially free from lead but includes $Li_2O$ as a material that provides a rod lens with the refractive index distribution in forming it. A gradient-index rod lens obtained using such a core glass composition can have an angular aperture of 8 to 18 degrees, particularly 10 to 14 degrees although it depends on the clad glass composition to be combined with the core glass composition and the conditions under which the ion exchanges are carried out in forming the rod lens from the mother glass rod 1.

Like the clad glass composition, in addition to the respective components described above, the core glass composition of the present invention may include the following various components, each of which is less than 0.5 mol %, for instance: $SO_3$ and F that is used as a fining agent for degassing (fining) when the core glass composition is melted (F is derived from a fluorine compound); and impurities derived from industrial glass materials.

Difference Δn in Refractive Index between Core and Clad

Figure 2:
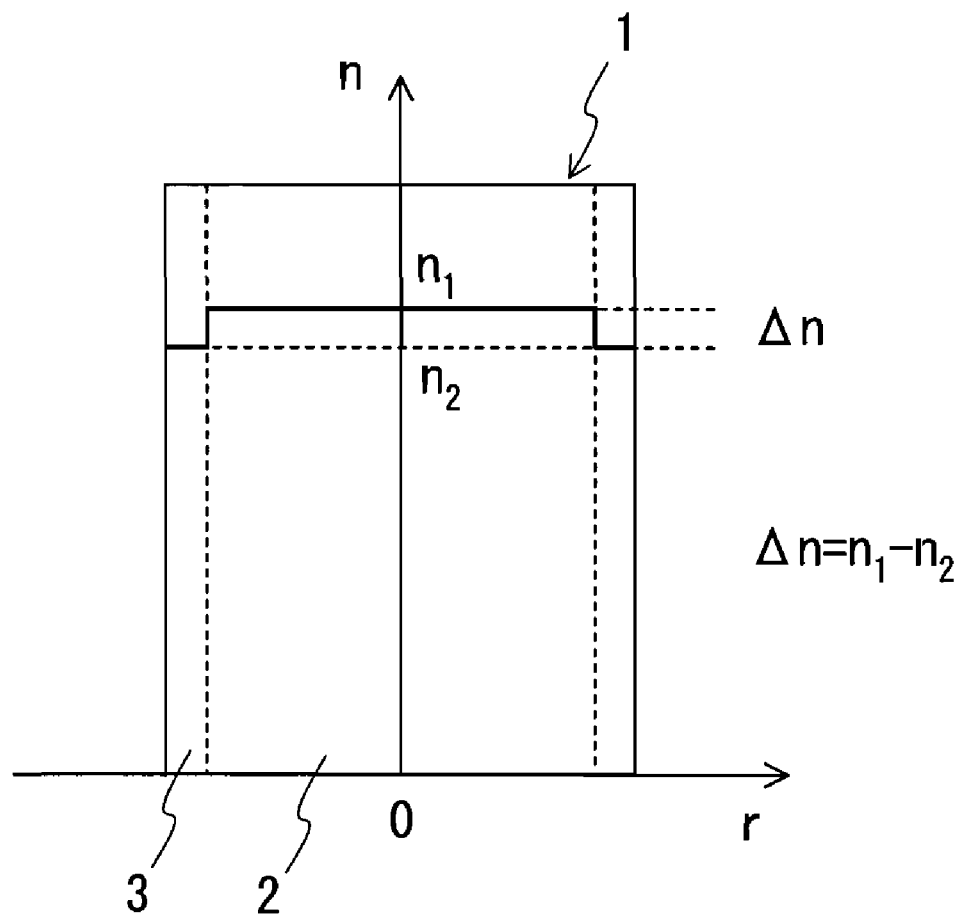
FIG. 2 is a diagram that schematically shows an example of the refractive index profile of the mother glass rod according to the present invention.

FIG. 2 is a schematic view showing an example of the radial refractive index profile of the mother glass rod 1. In the mother glass rod 1, it is preferable that the difference $\Delta n (\Delta n = n_1 - n_2)$ between the refractive index $n_1$ of the core 2 (the refractive index of the core glass composition) and the refractive index $n_2$ of the clad 3 (the refractive index of the clad glass composition) be in the range of −0.03 to 0.04. In this case, it is possible to reduce the reflection caused due to the difference in refractive index at the interface between the core 2 and the clad 3 when the mother glass rod 1 is formed into a rod lens. Accordingly, a rod lens can be formed that further can prevent stray light from occurring. The effect of preventing stray light from occurring can be improved further when the above-mentioned colorants are included in the clad glass composition.

The difference Δn in refractive index is preferably in the range of −0.03 to 0.026 and further preferably in the range of −0.03 to 0.02.

Diameter

The diameter of the mother glass rod 1 is not particularly limited but generally is in the range of 100 μm to 4.0 mm. When the diameter of the mother glass rod 1 exceeds, for instance, 400 μm, a rod lens that can prevent stray light from occurring can be formed by roughening the peripheral surface of the mother glass rod 1 through etching or by removing the clad 3. On the other hand, when the diameter of the mother glass rod 1 is 400 μm or smaller, such an etching process is difficult to carry out because the strength of the mother glass rod 1 might be reduced too much. In the mother glass rod of the present invention, however, since it is easy to match the clad glass composition with the core glass composition and the clad glass composition may include colorants as required, a rod lens that further can prevent stray light from occurring can be formed even if it is not necessarily formed with an etching process. That is, the diameter of the mother glass rod 1 is not limited to 400 μm or smaller, but when the diameter is 400 μm or smaller, the effect to be obtained through the use of the clad glass composition of the present invention can be exhibited further. When the mother glass rod 1 has a diameter of 400 μm or smaller, the rod lens formed of the mother glass also has a diameter of 400 μm or smaller.

Sizes of Core and Clad

Generally, the core 2 has a diameter in the range of 0.3 mm to 1.1 mm while the clad 3 has a thickness in the range of 5 μm to 100 μm.

Manufacturing Method

Figure 3:
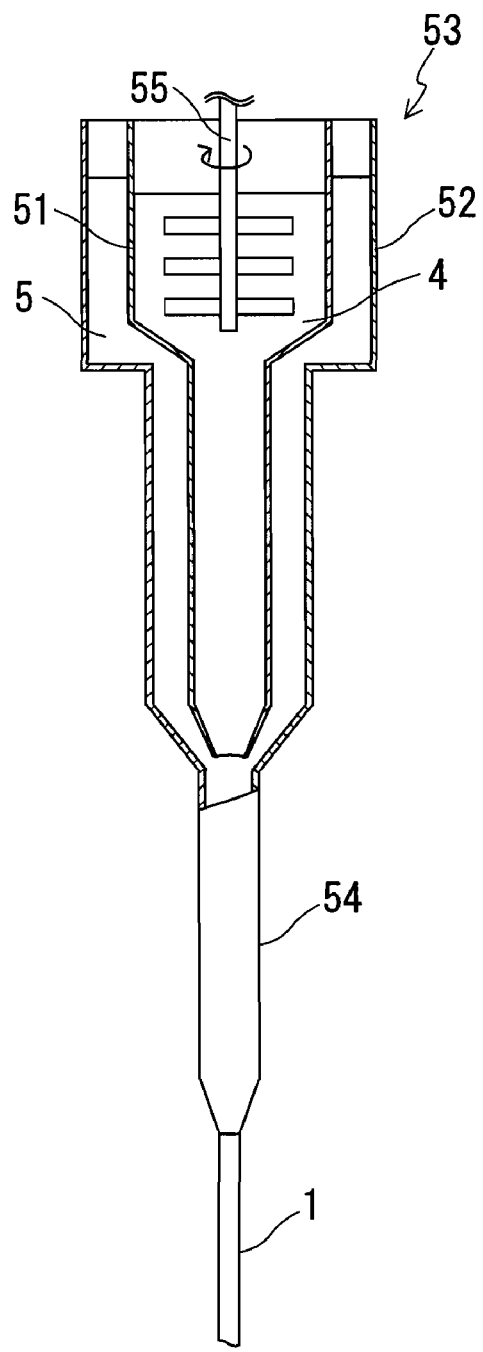
FIG. 3 is a partial cross-sectional view to be used for explaining an example of the concentric crucible drawing method for forming the mother glass rod of the present invention.

The mother glass rod 1 may be formed by the common concentric crucible drawing method using, for example, a concentric crucible 53 including an inner crucible 51 and an outer crucible 52 such as the one shown in FIG. 3. The concentric crucible 53 shown in FIG. 3 includes a nozzle 54 that is formed at the lower ends of the inner crucible 51 and the outer crucible 52 so as to extend continuously from the outer crucible 53. The inner crucible 51 includes a stirrer 55 that stirs a molten glass composition contained in the inner crucible 51.

The inner crucible 51 is charged with a core glass composition (a molten core glass composition) 4 that is in a molten state while the outer crucible 52 is changed with a clad glass composition (a molten clad glass composition) 5 that also is in a molten state. If necessary, the molten glass compositions may be subjected to a degassing process (a fining process) first and then may be put into the respective crucibles. Subsequently, the molten core glass composition 4 and the molten clad glass composition 5 are drawn out from the lower end of the nozzle 54 to be formed into a rod. Thus the mother glass rod 1 with a core/clad structure can be formed. The molten core glass composition 4 to be put into the inner crucible 51 includes $Li_2O$ as a material that provides the rod lens with a refractive index distribution in forming the rod lens. Furthermore, glass compositions that are in a semi-solid or solid state may be put into the respective crucibles and then may be heated and melted in the crucibles, so that the respective crucibles may be charged with the respective molten glass compositions.

In the concentric crucible drawing method, it is possible to control the diameter of the core 2 and/or the thickness of the clad 3 by controlling the difference in surface level between the molten clad glass composition and the molten core glass composition, the height of the surfaces of the molten glass compositions with respect to the nozzle 54, the temperature of the nozzle 54, etc.

Gradient-Index Rod Lens of the Present Invention

The gradient-index rod lens of the present invention is a rod lens obtained by providing the above-mentioned mother glass rod of the present invention with a refractive index distribution by the ion exchange method. Accordingly, the rod lens of the present invention is excellent in productivity and also can be excellent in optical characteristics (for instance, the MTF value to be described later in Examples) as stray light is prevented from occurring. Furthermore, the rod lens is substantially free from lead. Hence, color dispersion can be reduced while a certain degree of angular aperture is maintained. Thus the rod lens of the present invention is suitable for the processing of full color images.

Figure 4:
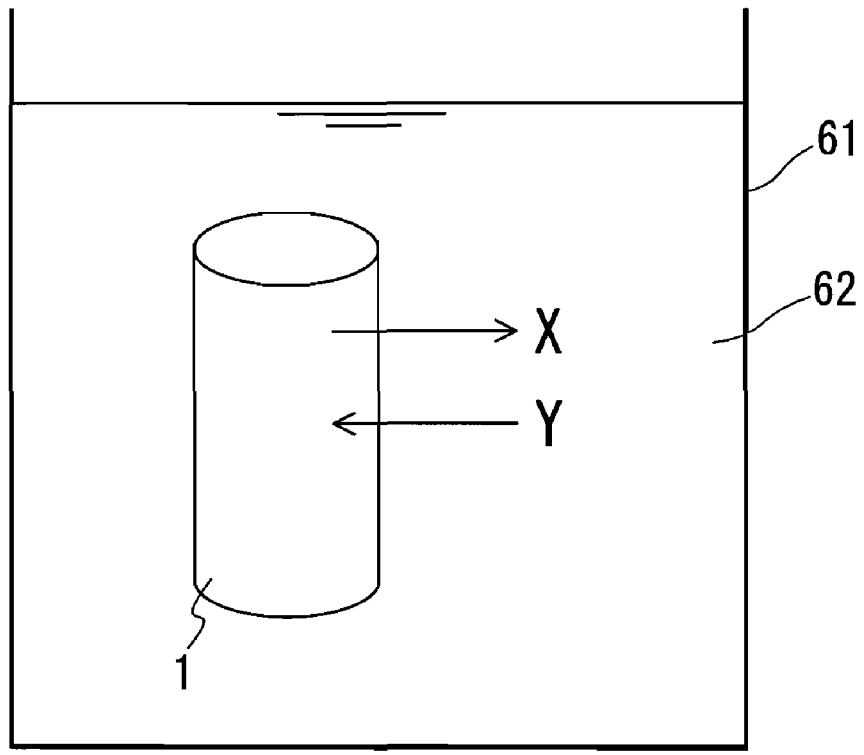
FIG. 4 is a schematic view to be used for explaining the principle of the ion exchange method for forming the rod lens of the present invention.

The ion exchange method can be carried out according to the common method. For instance, as shown in FIG. 4, the mother glass rod 1 may be immersed in molten salt 62 containing sodium (for example, molten salt of sodium nitrate) that is contained in a container 61 (for instance, made of stainless steel). In this case, it is preferable that the temperature of the molten salt 62 be maintained at a temperature around the glass-transition temperature of the glass composition that forms the mother glass rod 1. When the mother glass rod 1 is immersed in the molten salt 62, Li ions (indicated with the letter "X" in FIG. 4) contained in the mother glass rod 1 and the Na ions (indicated with the letter "Y" in FIG. 4) contained in the molten salt 62 are exchanged for each other. Thereby the mother glass rod 1 is provided with a composition distribution of Li in the radial direction thereof and thus is provided with a refractive index distribution. That is, it also can be said that the rod lens of the present invention is one obtained by providing the above-mentioned mother glass rod of the present invention with a refractive index distribution through the ion exchange that occurs between Li ions and Na ions. The shape of the rod lens thus formed is the same as that of the mother glass rod 1.

Figure 5:
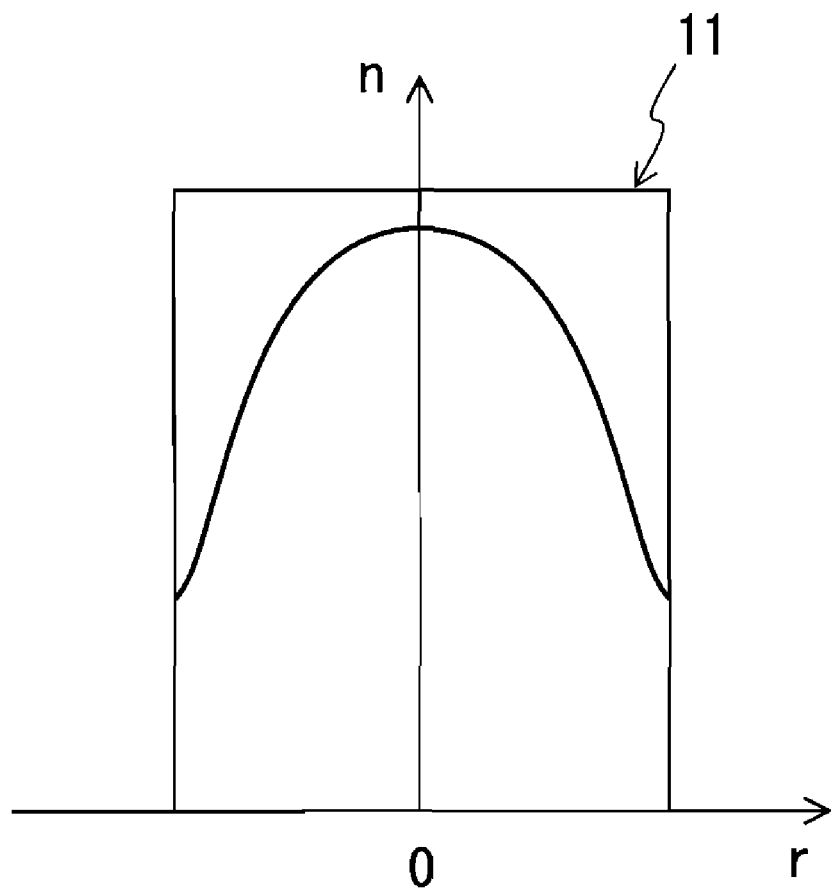
FIG. 5 is a diagram that schematically shows an example of the refractive index distribution of the rod lens according to the present invention.

FIG. 5 schematically shows an example of the refractive index distribution in the rod lens of the present invention. As shown in FIG. 5, the rod lens 11 of the present invention is provided with the refractive index distribution, when viewed in the radial direction thereof, in which the refractive index decreases relatively with the distance from the center part toward the peripheral part. This refractive index distribution corresponds to the Li distribution in the radial direction of the rod lens 11.

Rod Lens Array and Image Processor of the Present Invention

Figure 6:
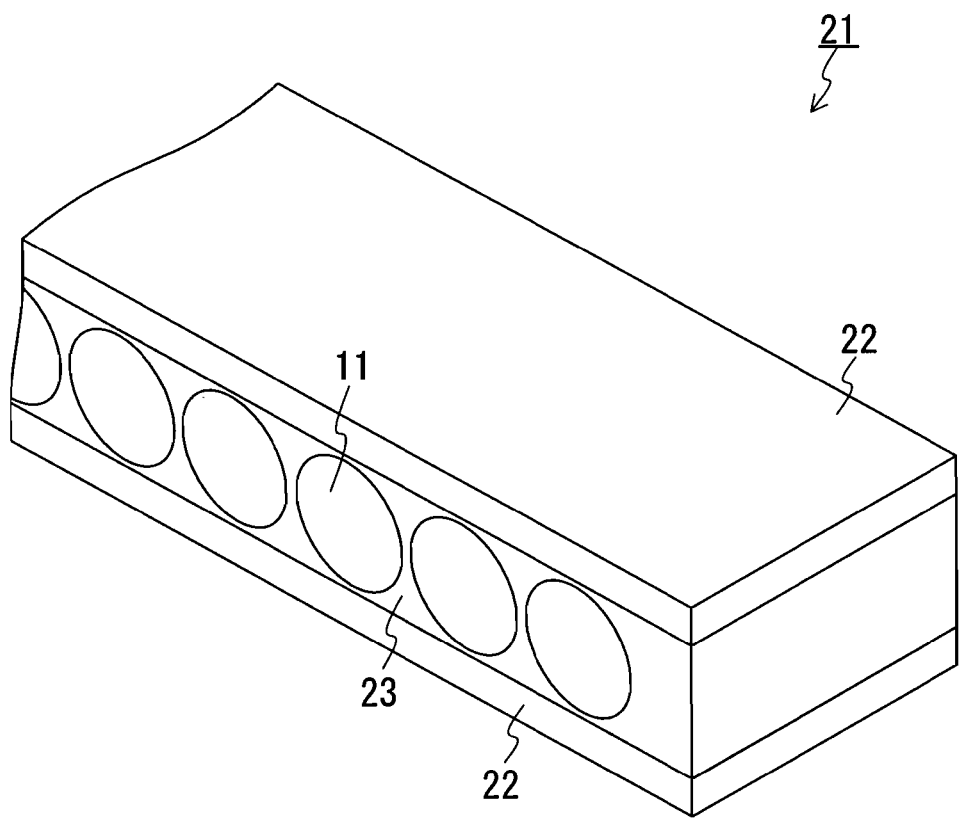
FIG. 6 is a perspective view showing an example of the rod lens array according to the present invention.

FIG. 6 shows an example of the rod lens array of the present invention. The rod lens array 21 shown in FIG. 6 includes at least two rod lenses 11. The rod lenses 11 are arrayed, with their optical axes being substantially in parallel with each other, and are formed into one body together with a pair of FRP substrates 22 and a black resin 23. Such a rod lens array 21 can be formed as follows. That is, after at least two rod lenses 11 are arrayed on the surface of one of the FRP substrates 22 so as to be substantially in parallel with each other and then are sandwiched between the one and the other of the FRP substrates 22, the space between the pair of FRP substrates 22 is filled with the black resin 23, which allows the respective members to be formed into one body, and further the end faces of the rod lenses 11 are polished.

The structure and the configuration of the rod lens array according to the present invention are not limited to those of the example shown in FIG. 6. The materials to be used for the respective parts composing the rod lens array can be the same as those that generally are used for a rod lens array.

Figure 7:
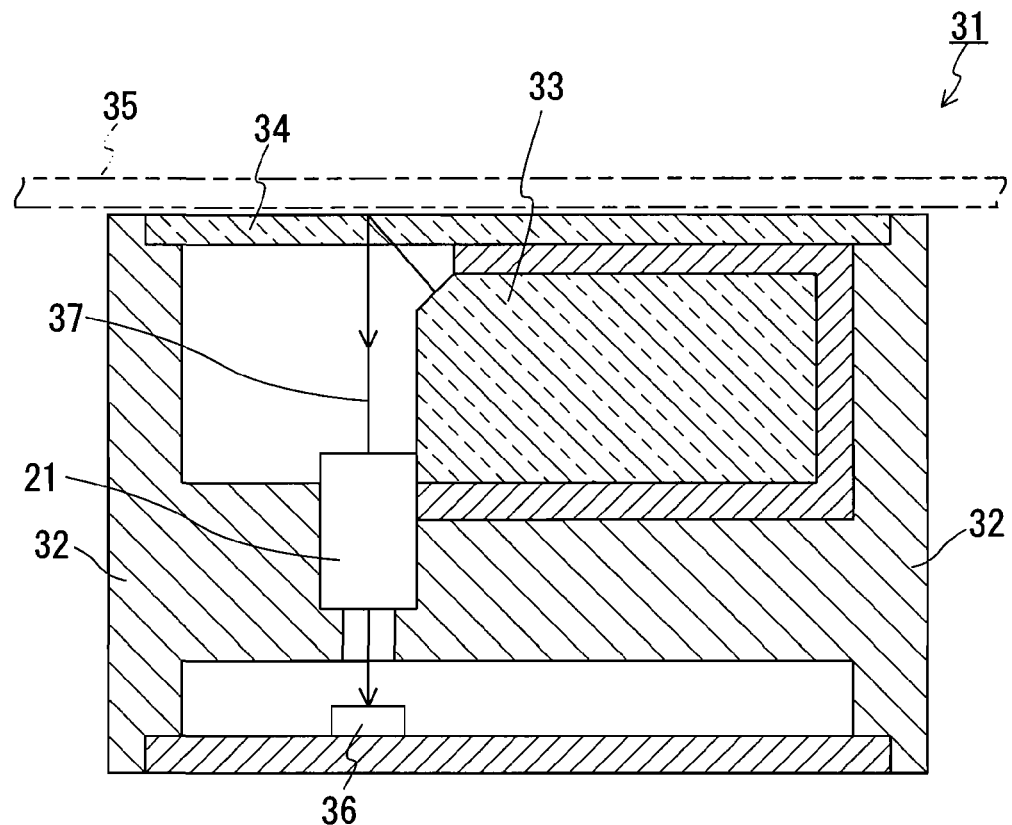
FIG. 7 is a cross-sectional view that schematically shows an example of the image processor according to the present invention.

FIG. 7 shows an example of image reader as an example of the image processor according to the present invention. The image reader 31 shown in FIG. 7 is a scanner and includes a linear lighting unit 33, a document glass 34 formed of a glass sheet, a rod lens array 21, and a photodetector 36 in a case 32. The rod lens array 21 is disposed on an optical path 37 of light that, when a manuscript 35 is placed on the document glass 34, is emitted from the linear lighting unit 33 to the manuscript 35, is reflected at the surface of the manuscript 35, and then enters the photodetector 36. The rod lens array 21 serves as an imaging optical system that allows the reflected light to form an image in the photodetector 36.

Figure 8:
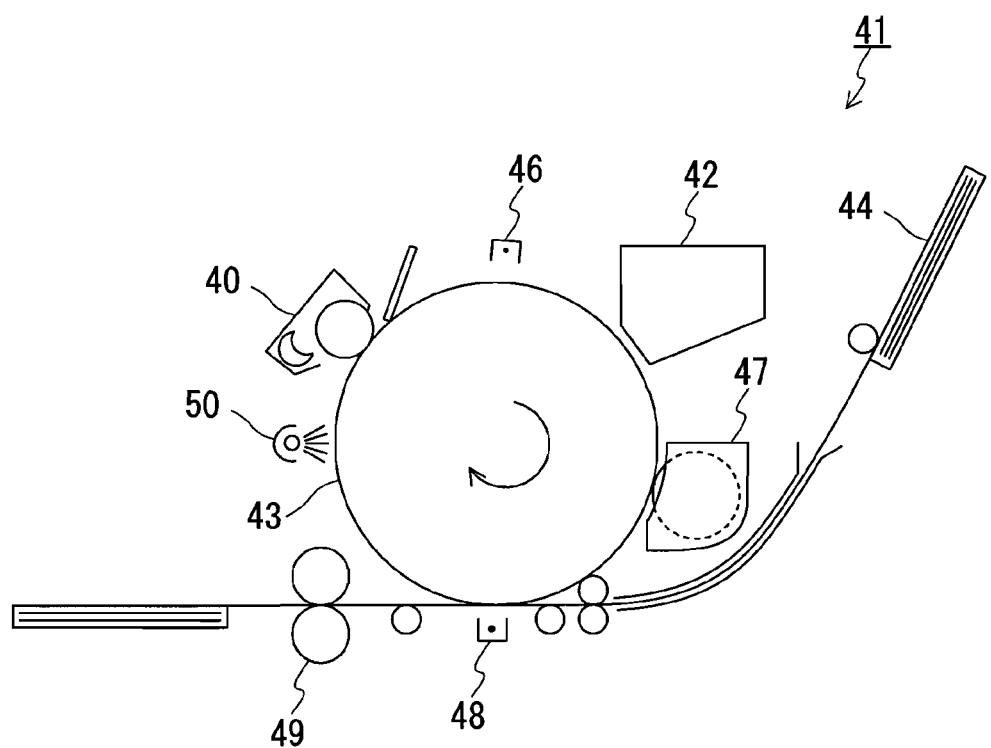
FIG. 8 is a schematic view showing another example of the image processor according to the present invention.
Figure 9:
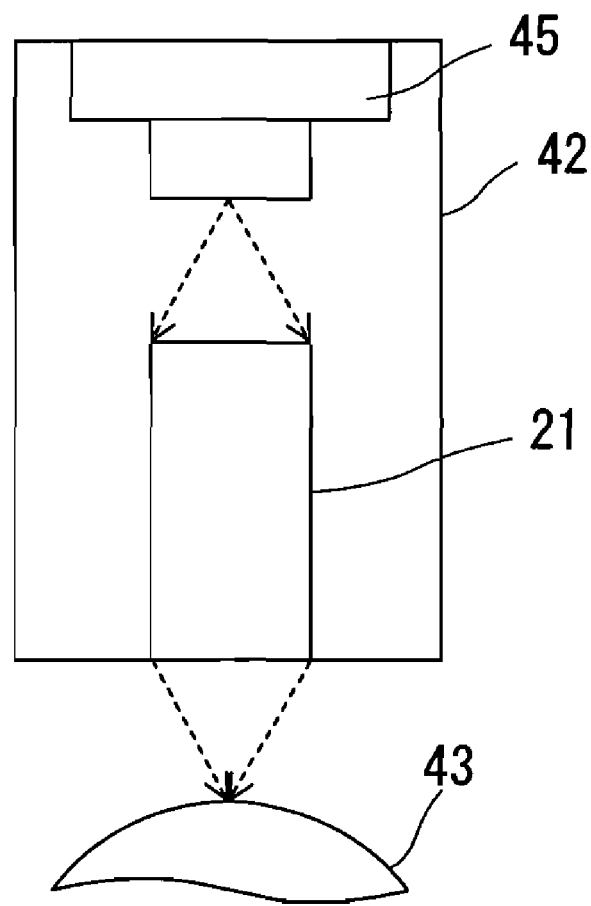
FIG. 9 is a schematic view showing a write head of the image processor shown in FIG. 8.
Figure 10:
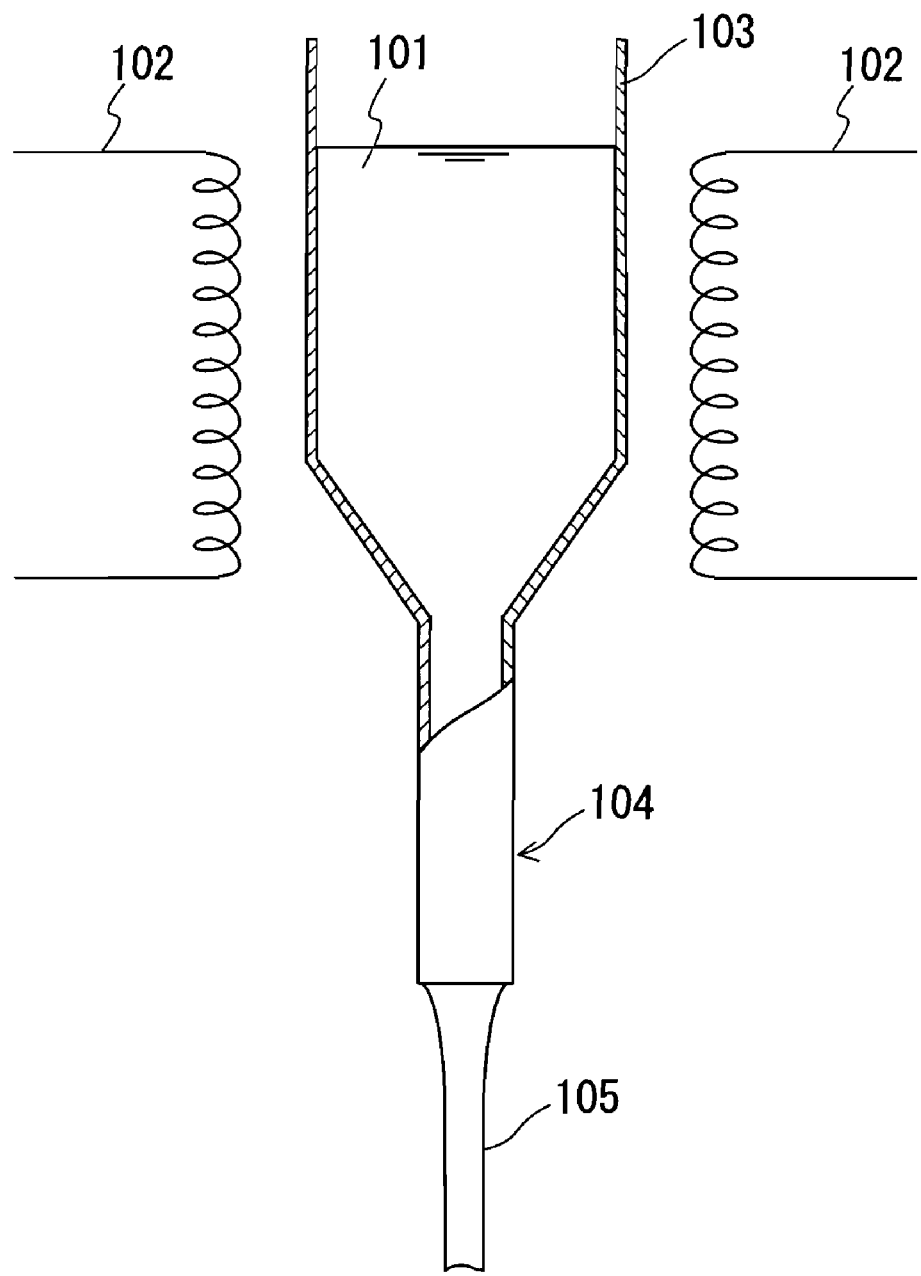
FIG. 10 is a partial cross-sectional view to be used for explaining a common direct drawing method.
Figure 11:
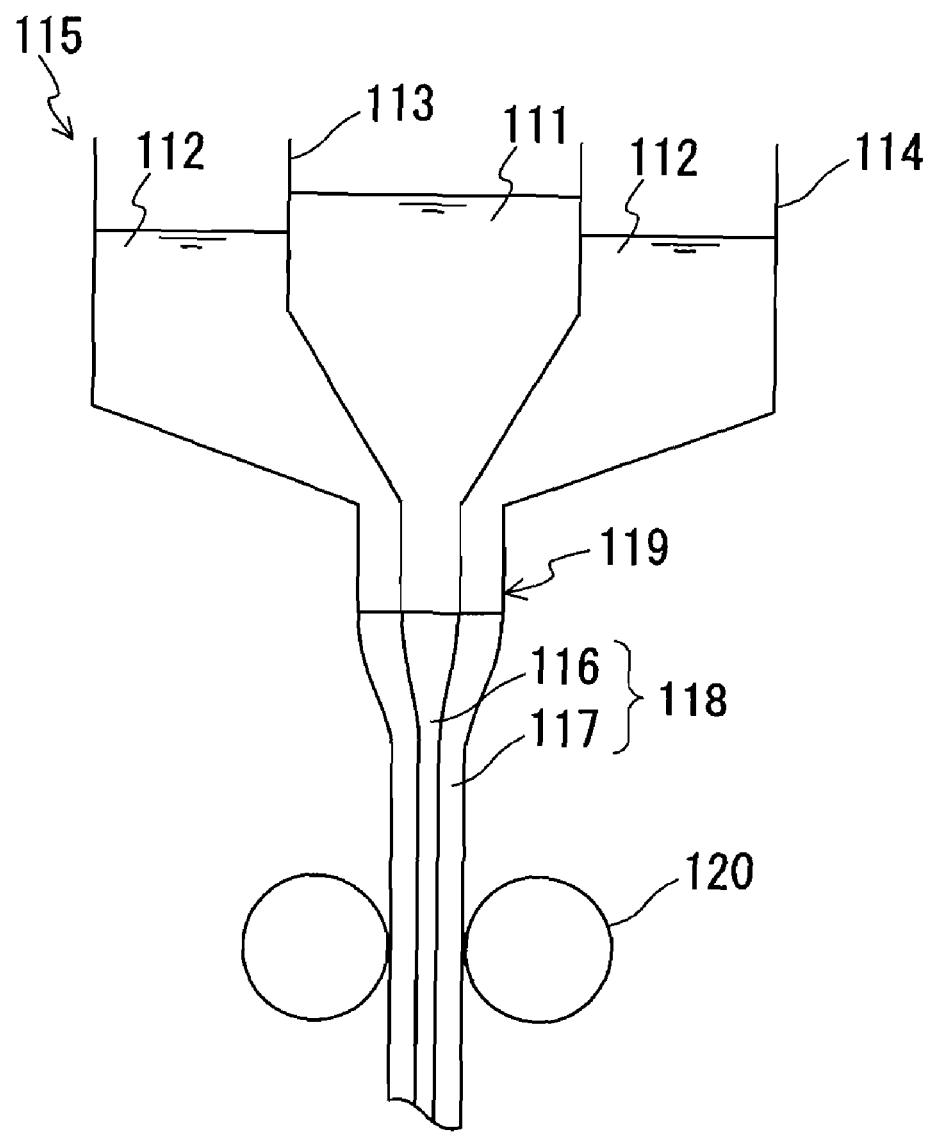
FIG. 11 is a cross-sectional view to be used for explaining a common concentric crucible drawing method.

FIG. 8 shows an example of image-forming apparatus as another example of the image processor according to the present invention. The image-forming apparatus 41 shown in FIG. 8 is an optical printer. It forms an image (a latent image) by allowing a photoconductor drum 43 to be exposed to light with a write head (an optical write head) 42 and then fixes the image thus formed onto a paper 44. In this case, as shown in FIG. 9, the write head 42 includes a rod lens array 21 of the present invention and a light emitting device array 45. The rod lens array 21 serves as an imaging optical system that allows the photoconductor drum 43 to be exposed to light emitted from the light emitting device array 45 (more specifically, the rod lens array 21 serves as an erecting unit optical system that allows the focal point to be on the surface of the photoconductor drum 43).

The optical printer shown in FIG. 8 has the same configuration as that of a common optical printer and allows images to be formed on the paper 44 by the same mechanism as that of the common optical printer. Specifically, a photosensitive layer made of a material (a photoreceptor) having photoconductivity such as amorphous Si is formed on the surface of the cylindrical photoconductor drum 43. First, the surface of the photoconductor drum 43 that is rotating is charged uniformly with an electrostatic charger 46. Subsequently, with the write head 42, the photosensitive layer of the photoconductor drum 43 is irradiated with light forming a dot image corresponding to an image to be formed and thereby the charge in the region of the photosensitive layer that has been irradiated with the light is neutralized. Thus a latent image is formed on the photosensitive layer. Thereafter, when the photosensitive layer is allowed contact with a developer 47, the toner deposits on the region of the photosensitive layer where the latent image has been formed, in accordance with the charged state of the photosensitive layer. Subsequently, a transfer unit 48 transfers the toner thus deposited onto the paper 44 fed from a cassette. Thereafter, when a fixer 49 heats the paper 44, the toner is fixed to the paper 44 to form an image. After the transfer is completed, the charge in the entire region of the photoconductor drum 43 is neutralized with an erasing lamp 50, and the toner remaining on the photosensitive layer is removed with a cleaner 40.

The rod lens array 21 of the present invention can be applied to arbitrary image processors in addition to the examples shown in FIGS. 7 to 9. Examples of the image processor including the rod lens array 21 include image-forming apparatuses such as LED array printers, liquid crystal shutter printers, etc. as well as image scanners such as facsimiles, scanners, etc.

EXAMPLES

Hereafter, the present invention is described further in detail using examples. The present invention, however, is not limited to the following examples.

Devitrification Resistance Evaluation Test

Eight types of clad glass compositions (Example Samples 1 and 2, and Comparative Example Samples 1 to 6) were produced, with their compositions varying from each other. Then the devitrification resistance of each of the samples was evaluated.

First, glass materials were mixed together so that the respective compositions shown in Table 1 and Table 2 were obtained. Subsequently, each of them was molten and then was solidified. Thus each clad glass composition was obtained. Subsequently, the clad glass composition thus obtained was pulverized so as to have a grain size of about 1 mm. The composition thus pulverized was washed well with ethanol and then was put into a boat (made of platinum: Length 200 mm, Width 12 mm, and Depth 8 mm) uniformly. Next, the boat was heated at a temperature of at least 1400° C. for 40 minutes and thereby the clad glass composition placed on the boat was melted uniformly. This then was maintained in a gradient furnace whose temperature was kept in the range of 600° C. to 1000° C., for 120 hours. Thereafter, the whole was cooled to be solidified and then the presence of devitrified bodies (devitrification phase) in the clad glass composition thus solidified was checked using an optical microscope at a magnification of 100 times. Thus the devitrification resistance was evaluated. When a large amount of devitrified bodies were found in the gradient furnace before a lapse of 120 hours, the glass composition was taken out at the time when they were found. Thereafter, the devitrification state thereof was observed with the optical microscope in the same manner as described above. The devitrification properties of each sample were evaluated that were obtained at temperatures in the respective ranges of 600° C. to 700° C., 700° C. to 800° C., and 800° C. to 1000° C. at which the clad glass composition was maintained in the gradient furnace.

As shown in Tables 1 and 2, in Comparative Example Samples 2 to 6, devitrified bodies were observed at the temperatures in all the ranges of 600° C. to 700° C., 700° C. to 800° C., and 800° C. to 1000° C. at which the clad glass composition was maintained in the gradient furnace. On the other hand, in Example Samples 1 and 2 and Comparative Example Sample 1, no devitrified bodies were observed at temperatures in all the above-mentioned ranges. Conceivably, Comparative Example Samples 2 to 6 are poor in devitrification resistance as compared to Example Samples 1 and 2 and Comparative Example Sample 1 because they contain alkaline-earth metal oxides whose content by percentage exceeds 20 mol %, they contain only one type of alkaline-earth metal oxides, and/or they are free from $Bi_2O_3$.

Furthermore, with respect to the respective clad glass compositions, their refractive indices were evaluated before the evaluation of their devitrification resistance was made (before they were pulverized). Consequently, as shown in Tables 1 and 2, Example Samples 1 to 2 that included $Bi_2O_3$ tended to have higher refractive indices than those of Comparative Example Samples that were free from $Bi_2O_3$. When the samples that were excellent in devitrification resistance were compared to each other, Comparative Example Sample 1 that was free from $Bi_2O_3$ had a refractive index of lower than 1.56 while Example Samples 1 and 2 had a refractive index of at least 1.58. In the samples that included $Fe_2O_3$ and CoO as colorants, it was difficult to determine the refractive index in the state where the colorants were contained therein. Hence, extra samples were produced that included the same components at the same relative molar ratios as those of the samples including $Fe_2O_3$ and CoO except that they were free from the colorants. Then the refractive indices of the extra samples were determined.

Drawing Test by Concentric crucible Drawing Method

Next, a drawing test was carried out using the concentric crucible shown in FIG. 3 with respect to Example Samples 1 and 2 and Comparative Example Sample 1 that had proved to be excellent in devitrification resistance and Comparative Example Sample 2 that typified the samples having poor devitrification resistance. Mother glass rods having the core/clad structure shown in FIG. 1A were formed and then were evaluated with respect to their states after having been drawn.

The mother glass rods were drawn using the above-mentioned respective samples as their clad glass compositions. The core glass compositions having the compositions indicated in Tables 1 and 2 were used as the core glass compositions to be combined with the respective samples. The core glass compositions to be used herein were core glass cullets that had been formed beforehand by mixing glass materials together, melting the mixture, and then solidifying it so as to have respective compositions indicated in Tables 1 and 2.

After the respective glass compositions were melted, they were put into respective crucibles, which then were subjected to the drawing test. The diameter of the mother glass rods to be drawn was set at 400 μm with respect to Example Sample 2 and at 300 μm with respect to the samples other than that.

As a result, in the case of using Example Samples 1 and 2 and Comparative Example Sample 1 as the clad glass composition, drawing could be carried out continuously for at least seven days. On the other hand, in the case of using Comparative Example Sample 2, devitrification occurred before a lapse of one day after the start of drawing and it therefore was difficult to continue the drawing for one day or longer. Conceivably, it was difficult to carry out stable drawing because the content by percentage of alkaline-earth metal oxides was at least 20 mol % in Comparative Example Sample 2 and thus devitrification occurred during the drawing. In addition, the devitrified bodies produced therein were analyzed with an electron probe X-ray microanalyzer (EPMA). As a result, it was found that the devitrified bodies were formed of devitrification phases including Si and Ba and/or Sr, which is an alkaline-earth metal element.

The refractive indices of the core glass compositions used for the respective samples are indicated in Tables 1 and 2. In all the samples that were subjected to the drawing test, the core glass compositions that had been combined with the respective samples had a refractive index in the range of 1.591 to 1.592.

Production of Rod Lens Array and MTF Value Evaluation Test

Next, the mother glass rods formed by the drawing test were provided with a refractive index distribution by the ion exchange method shown in FIG. 4. Thus rod lenses were formed. The ion exchange was carried out as follows. That is, the mother glass rods were immersed in molten salt of sodium nitrate that was maintained at a temperature around 500° C., and thereby Li ions contained in the glass composition and Na ions contained in the molten salt were exchanged for each other.

Subsequently, with the rod lenses formed by the ion exchange method, the rod lens array shown in FIG. 6 was produced. The mother glass rods formed using Example Samples 1 and 2 and Comparative Example Sample 1 allowed rod lenses with substantially uniform diameters to be obtained by the ion exchange method, which made it possible to produce rod lens arrays. However, since the mother glass rods formed using Comparative Example Sample 2 had variations in diameter, it was not possible to form a large number of rod lenses with uniform diameters. Thus it was difficult to produce a rod lens array.

Next, MTF (Modulation Transfer Function) values of the rod lens arrays formed above were evaluated. The MTF value is a value that indicates the contrast ratio between an object and an image obtained through a rod lens, as a function of spatial frequency. The closer the MTF value approaches 100%, the higher the fidelity to an original object (an original) with which an image has been formed and the higher the resolution to be exhibited. For the MTF value evaluation, the spatial frequency of a grid pattern was set at 12 Lp/mm, and lights with wavelengths of 470 nm, 530 nm, and 660 nm obtained by allowing white lights to go through interference filters were used as measuring light. The results of the MTF value evaluation are indicated in Tables 1 and 2.

TABLE 1

|  |  | Example Sample 1 | | Example Sample 2 | |
|---|---|---|---|---|---|
|  | Components | Core Glass Composition | Clad Glass Composition | Core Glass Composition | Clad Glass Composition |
| Composition (mol %) | $SiO_2$ | 52.4 | 59.2 | 54.1 | 60.0 |
|  | $TiO_2$ | 3.5 | 3.9 | 3.5 | 4.4 |
|  | $B_2O_3$ | 3.0 | 0.5 | 3.0 | 0.5 |
|  | $Bi_2O_3$ | 0.0 | 1.9 | 0.0 | 2.2 |
|  | $Li_2O$ | 9.4 | 0.0 | 8.5 | 0.0 |
|  | $Na_2O$ | 9.0 | 20.9 | 8.1 | 19.2 |
|  | MgO | 14.0 | 6.8 | 13.4 | 6.3 |
|  | SrO | 4.0 | 1.9 | 4.2 | 2.2 |
|  | BaO | 4.0 | 1.9 | 4.2 | 2.2 |
|  | ZnO | 0.0 | 0.0 | 0.0 | 0.0 |
|  | $La_2O_3$ | 0.0 | 0.0 | 0.0 | 0.0 |
|  | $Ta_2O_5$ | 0.0 | 0.0 | 0.0 | 0.0 |
|  | $ZrO_2$ | 0.6 | 0.5 | 0.9 | 0.6 |
|  | $Fe_2O_3$ | 0.0 | 1.7 | 0.0 | 1.7 |
|  | CoO | 0.0 | 0.7 | 0.0 | 0.7 |
|  | $Sb_2O_3$ | 0.1 | 0.1 | 0.1 | 0.0 |
|  | Total | 100.0 | 100.0 | 100.0 | 100.0 |
|  | Total $X_1$*[1] | — | 20.9 | — | 19.2 |
|  | Total $X_2$*[2] | — | 10.6 | — | 10.7 |
|  | $X_1 + X_2$ | — | 31.5 | — | 29.9 |
|  | Total A*[3] | — | 0.5 | — | 0.6 |
| Occurrence of Devitrification | 600–700° C. | — | No | — | No |
|  | 700–800° C. | — | No | — | No |
|  | 800–1000° C. | — | No | — | No |
| Drawable Period*[4] | Day | At least 7 days | | At least 7 days | |
|  | n | 1.592 | 1.58 | 1.591 | 1.584 |
|  | Δn | 0.012 | | 0.007 | |
|  | MTF Value | At least 60% | | At least 60% | |

*[1] Total $X_1$ denotes the total of the contents by percentage of alkali metal oxides.
*[2] Total $X_2$ denotes the total of the contents by percentage of alkaline-earth metal oxides.
*[3] Total A denotes the total of the contents by percentage of additional components.
*[4] "Drawable Period" denotes the number of days for which continuous drawing was possible.

TABLE 2

|  |  | C.E.S. 1 | | C.E.S. 2 | | C.E.S. 3 | C.E.S. 4 | C.E.S. 5 | C.E.S. 6 |
|---|---|---|---|---|---|---|---|---|---|
|  | Components | Core G.C. | Clad G.C. | Core G.C. | Clad G.C. | Clad G.C. | Clad G.C. | Clad G.C. | Clad G.C. |
| Composition (mol %) | $SiO_2$ | 51.5 | 54.3 | 52.4 | 51.8 | 53.5 | 52.4 | 51.1 | 57.1 |
|  | $TiO_2$ | 5.4 | 0.0 | 3.5 | 3.4 | 3.3 | 0.0 | 0.0 | 0.7 |
|  | $B_2O_3$ | 2.5 | 4.9 | 3.0 | 2.9 | 0.0 | 1.9 | 0.9 | 8.6 |
|  | $Bi_2O_3$ | 0.0 | 0.0 | 0.0 | 0.0 | 2.9 | 0.0 | 0.0 | 0.0 |
|  | $Li_2O$ | 12.2 | 0.0 | 9.4 | 4.5 | 0.0 | 0.0 | 0.0 | 0.0 |
|  | $Na_2O$ | 11.6 | 21.3 | 8.9 | 13.6 | 17.7 | 18.3 | 18.9 | 21.4 |
|  | MgO | 13.9 | 13.6 | 13.9 | 13.7 | 18.2 | 13.9 | 13.2 | 0.0 |
|  | SrO | 0.0 | 0.0 | 4.0 | 3.9 | 0.0 | 5.9 | 5.7 | 0.0 |
|  | BaO | 2.0 | 2.9 | 4.0 | 3.9 | 0.0 | 2.0 | 1.9 | 6.0 |
|  | ZnO | 0.0 | 0.0 | 0.0 | 0.0 | 0.0 | 4.0 | 0.0 | 0.0 |
|  | $La_2O_3$ | 0.0 | 0.0 | 0.0 | 0.0 | 0.0 | 0.0 | 0.0 | 0.0 |
|  | $Ta_2O_5$ | 0.0 | 0.0 | 0.0 | 0.0 | 0.0 | 0.2 | 0.9 | 1.0 |
|  | $ZrO_2$ | 0.8 | 0.5 | 0.8 | 0.5 | 0.9 | 1.3 | 2.8 | 2.6 |
|  | $Fe_2O_3$ | 0.0 | 1.9 | 0.0 | 1.1 | 2.2 | 0.0 | 3.4 | 2.0 |
|  | CoO | 0.0 | 0.6 | 0.0 | 0.6 | 1.2 | 0.0 | 1.1 | 0.6 |
|  | $Sb_2O_3$ | 0.1 | 0.0 | 0.1 | 0.1 | 0.1 | 0.1 | 0.1 | 0.0 |
|  | Total | 100.0 | 100.0 | 100.0 | 100.0 | 100.0 | 100.0 | 100.0 | 100.0 |
|  | Total $X_1$*[1] | — | 21.3 | — | 18.1 | 17.7 | 18.3 | 18.9 | 21.4 |
|  | Total $X_2$*[2] | — | 16.5 | — | 21.5 | 18.2 | 21.8 | 20.8 | 6.0 |
|  | $X_1 + X_2$ | — | 37.8 | — | 39.6 | 35.9 | 40.1 | 39.7 | 27.4 |
|  | Total A*[3] | — | 0.5 | — | 0.5 | 0.9 | 5.5 | 3.7 | 3.6 |
| Occurrence of Devitrification | 600–700° C. | — | No | — | Yes | Yes | Yes | Yes | Yes |
|  | 700–800° C. | — | No | — | Yes | Yes | Yes | Yes | Yes |
|  | 800–1000° C. | — | No | — | Yes | Yes | Yes | Yes | Yes |
| Drawable Period | Day | At Least 7 days | | Less than 1 day | | — | — | — | — |

TABLE 2-continued

|  | C.E.S. 1 | | C.E.S. 2 | | C.E.S. 3 | C.E.S. 4 | C.E.S. 5 | C.E.S. 6 |
|---|---|---|---|---|---|---|---|---|
| Components | Core G.C. | Clad G.C. | Core G.C. | Clad G.C. | Clad G.C. | Clad G.C. | Clad G.C. | Clad G.C. |
| n | 1.592 | 1.544 | 1.592 | 1.586 | 1.592 | 1.559 | 1.57 | 1.574 |
| Δn | 0.048 | | 0.006 | | — | — | — | — |
| MTF Value | 50% or lower | | — | | — | — | — | — |

*[1]Total $X_1$ denotes the total of the contents by percentage of alkali metal oxides.
*[2]Total $X_2$ denotes the total of the contents by percentage of alkaline-earth metal oxides.
*[3]Total A denotes the total of the contents by percentage of additional components.
*[4]"Drawable Period" denotes the number of days for which continuous drawing was possible.
* In Table 2, "C.E.S." denotes "Comparative Example Sample".
* In Table 2, "Core G.C." and "Clad G.C." denote "Core Glass Composition" and "Clad Glass Composition", respectively.

As shown in Tables 1 and 2, the rod lens array formed using Comparative Example Sample 1 had an MTF value of 50% or lower while the rod lens arrays formed using Example Samples 1 and 2 had excellent MTF values, specifically at least 60%. Conceivably, in Example Samples 1 and 2, since $Bi_2O_3$ was included, the clad glass compositions thereof had a refractive index of at least 1.58 and the differences Δn were 0.012 or smaller, which prevented stray light from occurring and thereby improved the MTF values.

Furthermore, with respect to the rod lens formed using Example Sample 1, the diameter thereof was set at 600 μm and the surface thereof was roughened through an etching process. In this case, the rod lens thus obtained also had a MTF value of at least 60%.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A mother glass rod for a gradient index rod lens having a core/clad structure,
   wherein a clad glass composition that forms a clad is a clad glass composition that comprises the following components, indicated by mol %:
   45 to 65% $SiO_2$;
   0.5 to 10% $TiO_2$;
   0 to 15% $B_2O_3$;
   0 to 7% $Al_2O_3$;
   0.1 to 10% $Bi_2O_3$;
   0 to 5% $Li_2O$;
   5 to 30% $Na_2O$;
   0 to 10% $K_2O$;
   0 to 15% MgO;
   0 to 10% CaO;
   0 to 10% SrO;
   0.5 to 10% BaO;
   0 to 10% $Cs_2O$;
   0 to 10% ZnO;
   0 to 7% $Y_2O_3$;
   0 to 7% $Nb_2O_5$;
   0 to 7% $In_2O_3$;
   0 to 7% $La_2O_3$;
   0 to 10% $Ta_2O_5$;
   0 to 7% $ZrO_2$; and
   0 to 1% $Sb_2O_3$,
   where the total of $Li_2O+Na_2O+K_2O$ is in a range of 5 to 35 mol %,
   the total of MgO+CaO+SrO+BaO is in a range of 2 to 20 mol %,
   the total of $Li_2O+Na_2O+K_2O$+MgO+CaO+SrO+BaO is in a range of 7 to 50 mol %, and
   the total of $Cs_2O$+ZnO+$Y_2O_3$+$Nb_2O_5$+$In_2O_3$+$La_2O_3$+$ZrO_2$+$Ta_2O_5$ is in a range of 0 to 15 mol %,
   at least two molar ratios selected from the group consisting of:
   MgO/(MgO+CaO+SrO+BaO);
   CaO/(MgO+CaO+SrO+BaO);
   SrO/(MgO+CaO+SrO+BaO); and
   BaO/(MgO+CaO+SrO+BaO)
   are at least 0.1, and
   the clad glass composition is substantially free from lead and has a refractive index in a range of 1.56 to 1.68, and
   a core glass composition that forms a core has a different composition from the clad glass composition, and comprises the following components, indicated by mol %:
   40 to 65% $SiO_2$;
   1 to 10% $TiO_2$;
   0 to 20% $B_2O_3$;
   0 to 10% $Al_2O_3$;
   5 to 12% $Li_2O$;
   5 to 15% $Na_2O$;
   0 to 16% MgO;
   0 to 15% CaO;
   0.1 to 12% SrO;
   0.1 to 12% SrO;
   0.1 to 12% BaO;
   0 to 3% $Cs_2O$;
   0 to 8% ZnO;
   0 to 5% $Y_2O_3$;
   0 to 5% $Nb_2O_5$.;
   0 to 5% $In_2O_3$;
   0 to 5% $La_2O_3$;
   0 to 5% $Ta_2O_5$;
   0 to 1% $SnO_2$;
   0 to 1% $Sb_2O_3$; and
   0 to 1% $As_2O_3$,
   where the total of $SiO_2+TiO_2+B_2O_3+Al_2O_3$ is in a range of 50 to 70 mol %,
   the total of $Li_2O+Na_2O$ is in a range of 10 to 27 mol %,
   the molar ratio of $Li_2O/Na_2O$ is in a range of 0.7 to 2, and
   the total of MgO+CaO+SrO+BaO is in a range of 5 to 36 mol %,
   at least two values selected from the contents by percentage of CaO, SrO, and BaO are in a range of 0.1 to 15 mol %, at least two molar ratios selected from the group consisting of:
MgO/(MgO+CaO+SrO+BaO);
CaO/(MgO+CaO+SrO+BaO);
SrO/(MgO+CaO+SrO+BaO); and
BaO/(MgO+CaO+SrO+BaO)
are at least 0.1, and
the core glass composition is substantially free from lead.

2. The mother glass rod for a gradient-index rod lens according to claim 1, wherein a difference $\Delta n$ ($\Delta n = n_1 - n_2$) between a refractive index $n_1$ of the core glass composition and a refractive index $n_2$ of the clad glass composition is in a range of −0.03 to 0.04.

3. The mother glass rod for a gradient-index rod lens according to claim 1, wherein the mother glass rod has a diameter of 400 μm or smaller.

4. A gradient-index rod lens obtained by providing a mother glass rod for a gradient-index rod lens according to claim 1 with a refractive index distribution by an ion exchange method.

5. A rod lens array comprising at least two gradient-index rod lenses according to claim 4,
wherein the rod lenses are arrayed and formed into one body, with their optical axes being substantially in parallel with each other.

6. An image processor comprising a rod lens array according to claim 5,
wherein the rod lens array serves as an imaging optical system.

* * * * *

UNITED STATES PATENT AND TRADEMARK OFFICE
CERTIFICATE OF CORRECTION

PATENT NO. : 8,193,108 B2  Page 1 of 1
APPLICATION NO. : 12/553454
DATED : June 5, 2012
INVENTOR(S) : Inoue et al.

It is certified that error appears in the above-identified patent and that said Letters Patent is hereby corrected as shown below:

Column 20, line 48 (Claim 1): Delete the "0.1 to 12% SrO;", which was inadvertently duplicated.

Signed and Sealed this
Twenty-third Day of October, 2012

David J. Kappos
*Director of the United States Patent and Trademark Office*